United States Patent [19]
Greene et al.

[11] Patent Number: 5,801,670
[45] Date of Patent: Sep. 1, 1998

[54] IMAGE GENERATION SYSTEM HAVING A HOST BASED RENDERING ELEMENT FOR GENERATING SEED PIXEL VALUES AND MESH ADDRESS VALUES FOR DISPLAY HAVING A RENDERING MESH FOR GENERATING FINAL PIXEL VALUES

[75] Inventors: Daniel H. Greene, Sunnyvale; J. Craig Mudge, Palo Alto, both of Calif.

[73] Assignee: Xerox Corporation, Stamford, Conn.

[21] Appl. No.: 468,170

[22] Filed: Jun. 6, 1995

[51] Int. Cl.$^6$ .................................................. G09G 3/20
[52] U.S. Cl. ...................... 345/90; 345/92; 345/147; 345/149; 345/206; 345/152; 345/505; 396/286
[58] Field of Search .................. 395/502, 505, 395/519, 509; 345/92, 90, 206, 149, 152, 138, 121, 128, 132, 502, 505, 519, 509, 147; 355/44; 396/282

[56] References Cited

U.S. PATENT DOCUMENTS

| | | | |
|---|---|---|---|
| 4,763,280 | 8/1988 | Robinson et al. | 345/433 |
| 4,783,649 | 11/1988 | Fuchs et al. | 345/509 |
| 4,827,445 | 5/1989 | Fuchs | 345/514 |
| 4,860,248 | 8/1989 | Lumelsky | 345/502 |
| 4,890,097 | 12/1989 | Yamashita et al. | 345/93 |
| 4,912,659 | 3/1990 | Liang | 345/434 |
| 5,136,664 | 8/1992 | Bersack et al. | 382/304 |
| 5,163,126 | 11/1992 | Einkauf et al. | 345/423 |
| 5,296,870 | 3/1994 | Nicholas | 345/89 |
| 5,339,092 | 8/1994 | Johnson et al. | 345/136 |
| 5,377,320 | 12/1994 | Abi-Ezzi et al. | 345/502 |
| 5,440,718 | 8/1995 | Kumagai et al. | 711/154 |
| 5,481,669 | 1/1996 | Poulton et al. | 345/505 |
| 5,517,603 | 5/1996 | Kelley et al. | 345/426 |
| 5,528,738 | 6/1996 | Sfarti et al. | 345/443 |
| 5,539,873 | 7/1996 | Yoshimori et al. | 345/502 |
| 5,543,819 | 8/1996 | Farwell et al. | 345/150 |
| 5,555,356 | 9/1996 | Scheibl | 345/434 |
| 5,621,866 | 4/1997 | Murata et al. | 345/422 |

FOREIGN PATENT DOCUMENTS

WO 94/11807 5/1994 WIPO.

OTHER PUBLICATIONS

Fuchs, H., Goldfeather, J., Hultquist, J.P., Spach, S., Austin, J.D., Brooks, Jr., F.P., Eyles, J.G., and Poulton, J., "Fast Spheres, Shadows, Textures, Transparencies, and Image Enhancements in Pixel–Planes," *Siggraph '85 of the ACM*, vol. 19, No. 3, Jul. 22–26, 1985, pp. 111–120.

Reichart, A., Garda, P., Belhaire, E., Devos, F., and Zavidovique, B., "A 60X60 Processor Array Smart Sensor For Binary Image Processing," *IAPR Workshop on CV–Special Hardware and Industrial Applications*, Tokyo, Oct. 12–14, 1988, pp. 233–236.

(List continued on next page.)

*Primary Examiner*—Eddie P. Chan
*Assistant Examiner*—Hong C. Kim
*Attorney, Agent, or Firm*—Richard B. Domineo

[57] ABSTRACT

A system for generating images having display based computation. The system of the present invention divides the image generation process between the display and a host computer system. The computation element of the display includes rendering mesh comprising a plurality of processing elements. One or more processing elements of the rendering mesh correspond to one or more pixels of the display. The host computer system includes a processing means for generating a rendering mesh map. The rendering mesh map is used to identify processing elements of the rendering mesh which will receive "seed" pixel values. The rendering mesh map is stored in a rendering mesh map buffer. The "seed" pixel values are stored in a frame buffer and represent an original rendering of an image. When the rendering mesh is seeded, pixel values are determined for the "unseeded" processing elements. The final pixel values are determined from the contents of the corresponding processing elements

14 Claims, 10 Drawing Sheets

OTHER PUBLICATIONS

Forchheimer, R., Ingelhag, P., and Jansson, C., "MAPP2200–A second generation smart optical sensor," *Image Processing and Interchange*, SPIE vol. 1659, 1992, pp. 2–11.

Garda, P., Reichart, A., Rodriguez, H., Devos, F., and Zavidovique, B., "Yet Another Mesh Array Smart Sensor ?," *IEEE*, 1988, pp. 863–865.

Garda, P., Zavidovique, B., and Devos, F., "Integrated Cellular Array Performing Neighborhood Combinatorial Logic On Binary Pictures," *IEF, Faculte de Paris XI, ADFAC–ETCA*, Paris, pp. 58–64.

Fuchs, H., Poulton, J., Paeth, A., and Bell, A., "Developing Pixel–Planes, A Smart Memory–Based Raster Graphics System," 1982 *Conference on Advanced Research in VLSI, M.I.T.*, Jan. 27, 1982, pp. 137–146.

Zavidovique, B.Y., and Bernard, T.M., "Generic Functions For On–Chip Vision," *IEEE Proceedings of 11th IAPR International Conference on Pattern Recognition*, The Hague, The Netherlands, Aug. 30–Sep. 3, 1992, vol. IV, pp. 1–10.

Bernard, T.M., Zavidovique, B.Y., and Devos, F.J., "A Programmable Artificial Retina," *IEEE Journal of Solid–State Circuits*, vol. 28, No. 7, Jul. 1993, pp. 789–798.

Shiffman, R.R., and Parker, R.H., "An Electrophoretic Image Display With Internal NMOS Address Logic And Display Drivers," *Proceedings of the SID*, vol. 25, 2. 1984, pp. 105–115.

Fossum, E.R., "Architectures for focal plane image processing," *Optical Engineering*, Aug. 1989, vol. 28, No. 8, pp. 865–871.

Lewis, A.G., Lee, D.D., and Bruce, R.H., "Polysilicon TFT Circuit Design and Perormance," *IEEE Journal of Solid–State Circuits*, vol. 27, No. 12, Dec. 1992, pp. 1833–1842.

Espejo, S., Rodriguez–Vasquez, A., Dominguez–Castro, R., Huertas, J.L., and Sanchez–Sinencio, E., "Smart–Pixel Cellular Neural Networks in Analog Current–Mode CMOS Technology," *IEEE Journal of Solid–State Circuits*, vol. 29, No. 8, Aug. 1994, pp. 895–904.

Yu, P.C., Decker, S.J., Lee, H.–S., Sodini, C.G., and Wyatt, Jr., J.L., "CMOS Resistive Fuses for Image Smoothing and Segmentation," *IEEE Journal of Solid–State Circuits*, vol. 27, No. 4, Apr. 1992, pp. 445–453.

Kobayashi, H., White, J.L., and Abidi, A.A., "An Active Resistor Network for Gaussian Filtering of Images," *IEEE Journal of Solid–State Circuits*, vol. 26, No. 5, May 1991, pp. 738–748.

Kramer, J., Seitz, P., and Baltes, H., "Industrial CMOS technology for the integration of optical metrology systems (photo–ASICs)," *6th International Conference on Solid–State Sensors and Actuators* (Transducers '91), San Francisco, CA. USA, Jun. 24–28, 1991, pp. 21–30.

Fossum, E.R., "Active Pixel Sensors: Are CCD's Dinosaurs?," *SPIE*, vol. 1900, Jul. 1993, pp. 2–13.

Perona, P., and Jitendra, M., "Scale–Space and Edge Detection Using Anisotropic Diffusion," *IEEE Transactions on Pattern Analysis and Machine Intelligence*, vol. 12, No. 7, Jul. 1990, pp. 628–639.

European Search Report and Annex for Application No. EP–96–30–3981, publishedOct. 16, 1996.

Ishii, M., Goto, G., Hatano, Y., "Cellular Array Processor CAP and Its Application to Computer Graphics", *Fujitsu Scientific & Technical Journal*, vol. 23, No. 4, 1987, pp. 379–390, XP000110855.

Shoup, R.G., "Real–Time Image Manipulation Using Soft Hardware", *International Conference on Systems, Man and Cybernetics*, Oct. 17–20, 1993, New York, N.Y. U.S., pp. 343–348, XP000481987.

IMAGE GENERATION SYSTEM HAVING A HOST BASED RENDERING ELEMENT FOR GENERATING SEED PIXEL VALUES AND MESH ADDRESS VALUES FOR DISPLAY HAVING A RENDERING MESH FOR GENERATING FINAL PIXEL VALUES

FIELD OF THE INVENTION

The present invention relates to the field of image generation, in particular to systems which provide discrete processing elements for each pixel in a display.

BACKGROUND OF THE INVENTION

Various methods and architectures exists for generating pixel data for displaying images on a bit-mapped, raster scan display. A bit-mapped, raster scan display is one where each pixel on the display can be independently addressed and driven. FIG. 1 illustrates the basic architecture for a bit-mapped display system. An image processor 101 receives image data 100 and renders pixel data 102. The image processor 101 may be a single processor, a string of pipelined processors, an array of processors or be part of a general purpose processor. The image data 100 will be some abstract representation of the image to be displayed. The image processor 101 will then render the image data 100 according to some specified rendering technique. The resulting pixel data 102 is then stored in frame buffer 103. The frame buffer 103 will typically have at least as many addressable storage locations as there are pixels on display 104. When the image is ready to be displayed, it is transferred from the frame buffer 103 to the display 104. The values for each pixel in the pixel data 102 are then used to determine the color or intensity emitted by the corresponding pixel.

As noted above various architectures exist for generating pixel data. A related architecture to the present invention is described in "Developing Pixel-Planes, A Smart Memory-Based Raster Graphics Systems", Fuchs, et al., Proceedings of the 1982 MIT Conference on Advanced Research in VLSI, 137–146. In Pixel-Planes, a small amount of processing circuitry is added to each pixel storage location of the memory comprising a frame buffer. The Pixel-Planes work utilizes advances in Very Large Scale Integration (VLSI) chip design and fabrication technologies to facilitate rendering of three-dimensional color rendered surfaces. Pixel Planes are further described in U.S. Pat. Nos. 4,590,465, 4,827,445 and 4,783,649. In an article entitled "Fast Spheres, Shadows, Textures, Transparencies, and Image Enhancements in Pixel-Planes", Fuchs, et al., Siggraph '85, Volume 19, Number 3 (1985), it is stated that the Pixel-planes architecture is to be integrated with a silicon-based flat-screen display so that display itself would be capable of handling display computations.

Another related field is smart optical sensors. Smart optical sensors enable certain image processing functionality for use with image capture devices. One such smart optical sensor is described in "MAPP2200- A Second Generation Smart Optical Sensor", Forchheimer et al., SPIE Vol. 1659 Image Processing and Interchange Pgs 2–11 (1992). In such smart optical sensors, processing circuitry is provided on the same chip as the image capture circuitry.

SUMMARY OF THE INVENTION

A system for image generation having display based computation is disclosed. The system of the present invention divides the image generation process between the display and a host computer system. The computation element of the display includes rendering mesh comprising a plurality of processing elements. One or more processing elements of the rendering mesh correspond to one or more pixels of the display. The host computer system includes a processing means for generating a rendering mesh map. The rendering mesh map is used to identify processing elements of the rendering mesh which will receive "seed" pixel values. The rendering mesh map is stored in a rendering mesh map buffer. The "seed" pixel values are stored in a frame buffer and represent an original rendering of an image.

The creation of an image in the present invention starts with the rendering of an image. The rendered image is typically stored in the frame buffer of the host computer system. It is assumed that the pixel values are stored at their display coordinates. The display coordinates of the rendered image are then transformed into coordinate addresses of processor elements in the rendering mesh. The transformation that occurs will depend on the desired image processing function. For example, it may be desirable to distort an image prior to display. The rendering mesh is then seeded based on corresponding pairs of pixel values from the frame buffer and coordinate addresses from the rendering mesh map. The rendering mesh will then propagate the seeded pixel values to the remainder of the processor elements based on some flooding methodology. A final value for each pixel is then generated based on the values contained in the processor elements for the corresponding pixels.

The display of the present invention is a polysilicon Liquid Crystal Display wherein the pixels and the rendering mesh are fabricated on the same substrate. The placement of processing capacity on the same substrate as the pixel reduces the data transfer bandwidth requirements between the host computer system and the display. Further, such placement enables the use of analog processing techniques for creation of the rendered image. Other advantages of the present invention include faster rendering speeds due to parallel processing and economic benefits resulting from more efficient use of the display substrate.

DETAILED DESCRIPTION OF THE PREFERRED EMBODIMENTS

A system for image generation having displayed based computation is disclosed. In the following description numerous specific details are set forth, such as the operation of Liquid Crystal Displays, in order to provide a thorough understanding of the present invention. It would be apparent, however, to one skilled in the art to practice the invention without such specific details. In other instances, specific implementation details, such as fabrication processes for polysilicon Liquid Crystal Displays, have not been shown in detail in order not to unnecessarily obscure the present invention.

In the foregoing, the term pixel refers to a single light emitting element of a display. The term pixel value refers to a generated or rendered value used by a display to indicate a pixels intensity level. The term subpixel refers to a logical element representing a spatial portion of a pixel and which contains a component of the ultimate intensity value for the corresponding pixel. A grouping of subpixels will correspond to a pixel.

Figure 1:
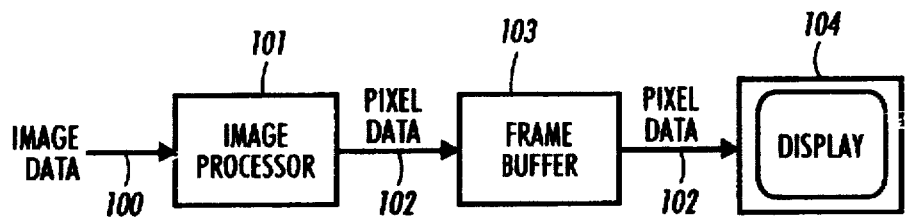
FIG. 1 is a block diagram of a prior art architecture for a bit-mapped display system.
Figure 2:
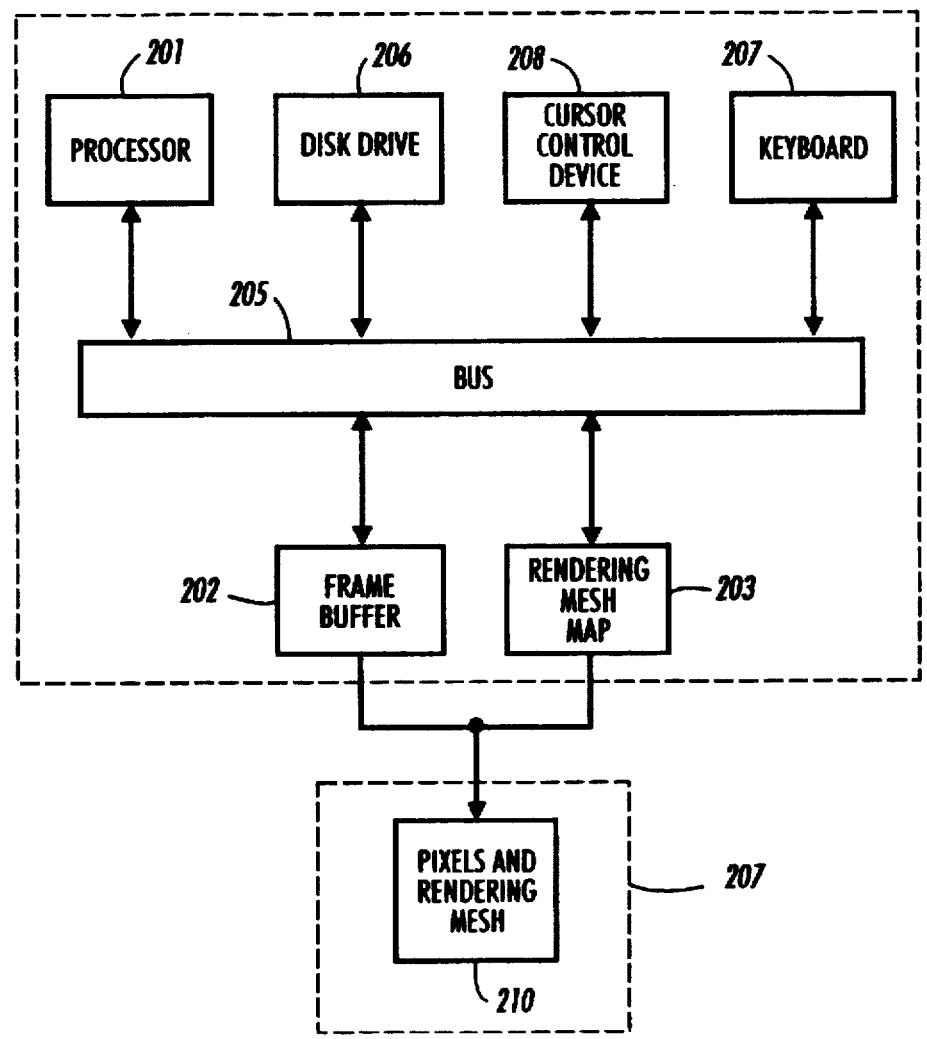
FIG. 2 is a block diagram of the basic components of the bit-mapped display system of the currently preferred embodiment of the present invention.

Overview of an Image Generation and Display System In the Currently Preferred Embodiment of the Present Invention The image generation and display system of the currently preferred embodiment is described with reference to FIG. 2. Referring to FIG. 2, a host computer system 200 is comprised of a processor 201, internal memory (e.g. ROM and RAM memories) 204, a frame buffer 202 and a rendering mesh map 203 which are connected via bus 205. The bus 205 is for transferring information between the components of host computer system 200. It should be noted that the bus 205 would typically be comprised of a plurality of busses, e.g. address, data and control busses and/or a high speed system bus coupled to a lower speed peripheral bus. The processor 201 is used to perform various processing functions for the rendering of image data that results in the pixel data that is stored in the frame buffer 202 and the transformation of image coordinates resulting in the processor element addresses stored in rendering mesh map 203. Storage locations in the frame buffer 202 and rendering mesh map 203 are paired so that a pixel value in the frame buffer 202 is paired with a corresponding address from the rendering mesh map 203. It should be noted that the use of the rendering mesh map 203 is not needed for rendering or manipulating all images. Some images may be rendered and placed in the frame buffer and transferred directly to the display without the display processing that is described below.

Further coupled to the bus 205 is disk drive 206, keyboard 207, cursor control device 208 and display unit 209. Such components are typical for an interactive image generation system.

Figure 3:
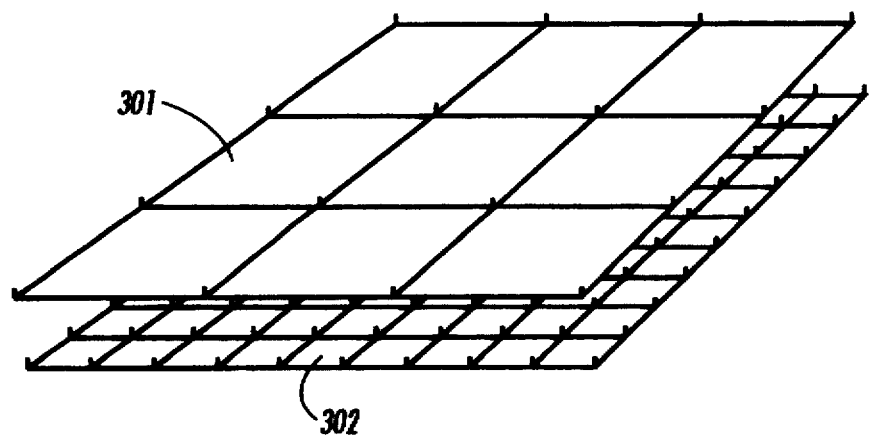
FIG. 3 illustrates the logical relationship between a rendering mesh and a pixel in the currently preferred embodiment of the present invention.

The display unit 209 is comprised of a subtrate comprising a plurality of pixels and a mesh of processing elements 210. The logical relationship between pixels and the mesh of processing elements is illustrated in FIG. 3. Referring to FIG. 3, an array of pixels 301 is comprised of a plurality of pixels. The mesh of processing elements 302 illustrated in FIG. 3 are grouped so that a 3×3 array of processing elements correspond to each pixel. The processing elements will communicate locally in a square (or alternatively hexagonal) mesh, and each processing element will have at least one writable register. A subset of the processing elements (i.e. one of the processing elements in a group) will have the extra capability to drive the pixels of the display.

Further, the processing mesh may also include the capability to control pixels through analog processing techniques.

The display of the currently preferred embodiment is implemented using liquid crystal cell technology. Such a display will typically be constructed using polysilicon Very Large Scale Integration (VLSI) fabrication techniques. The design of liquid crystal displays is described in "Liquid Crystal TV Displays: Principles and Applications Of Liquid Crystal Displays", E. Kaneko, KTK Scientific Publishers, 1987. For current polysilicon active matrix liquid crystal displays, each pixel area is comprised of a light valve through which light emanates; and circuitry for controlling the light valve. It is generally acknowledged that device sizes in VLSI technology will continue to shrink. Accordingly, it is anticipated that both the size of the light valve and circuitry will decrease thus enabling the placement of a greater amount of control circuitry on the display substrate. In the currently preferred embodiment, the rendering mesh and the pixel area will reside on the same substrate.

Figure 4:
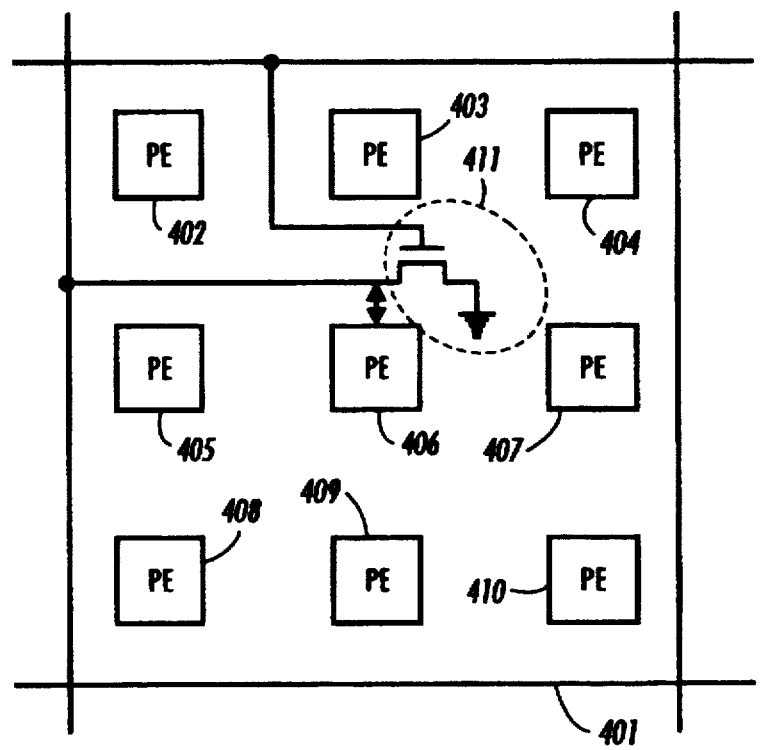
FIG. 4 illustrates a single pixel and the corresponding processing elements of a rendering mesh in the currently preferred physical embodiment of the present invention.

FIG. 4 illustrates a single pixel area and it's corresponding array of processing elements. Referring to FIG. 4, pixel area 401 includes processing elements 402–410. Such processing elements will be enabled to communicate with its horizontal and vertical neighbors. The display characteristics of a pixel (e.g. color or greyscale value) are controlled by light valve 411. Here, the light valve 411 is controlled by processing element 406.

Alternative implementations of the mesh may be used which would time multiplex one processing element per pixel to achieve the effect of the mesh, or, if necessary, a coarser array of processing elements could serve groups (sub-arrays) of pixels. Further, the memory and/or processor elements may also be realized on a separate layer with vias connected to it.

Figure 5:
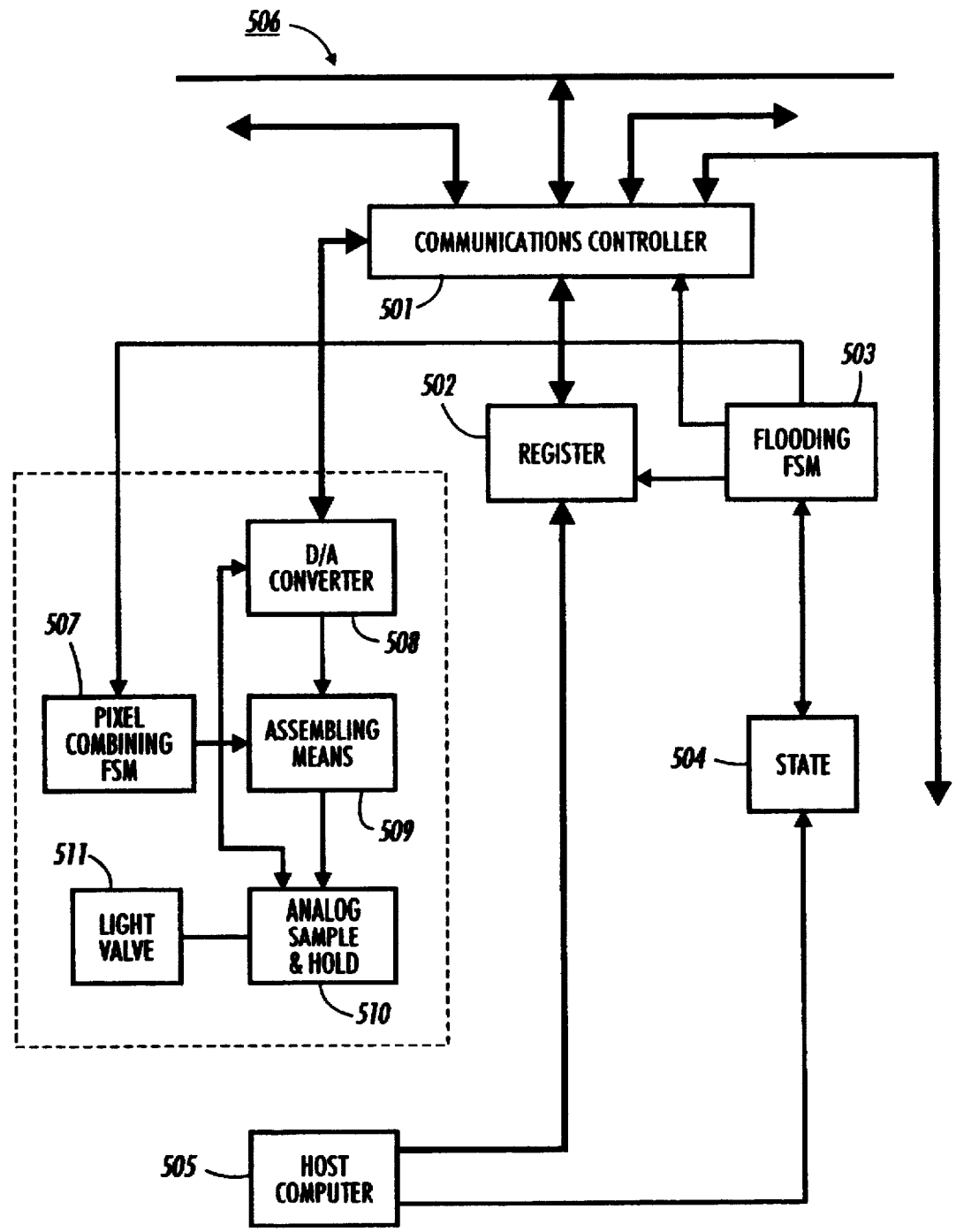
FIG. 5 is a block diagram illustrating in greater detail the functional components of a processing element in the currently preferred embodiment of the present invention.

FIG. 5 is a block diagram illustrating a processing element in greater detail. Referring to FIG. 5, a processing element is comprised of a communications controller 501, a register 502, a flooding finite state machine 503 and a state register 504. The communications controller 501 facilitates the transfer of data, i.e. pixel values, between neighbor processing elements via communications lines 506. The register 502 stores a pixel value for the processing element. The flooding finite state machine 503 implements and embodies the flooding technique utilized. The state register 504 is used to indicate whether or not the processing element contains a pixel value. The register 502 is coupled to host computer 505 for receiving a seed pixel value. The state register 504 is also coupled to host computer 505 to receive a signal indicating that it has received a seed pixel value.

Further illustrated in FIG. 5 is additional functionality for the processing elements which generate the final pixel value and control the light valve. When the final pixel value is to be generated, the FSM 503 sends a signal to Pixel Combining FSM 507. The Pixel Combining FSM 507 controls the process for the creation of the final pixel value. The digital pixel values from the various associated processor elements are obtained via Communications Controller 501 and converted into an analog signal via Digital to Analog (D/A) converter 508. The various analog signals are then assembled in assembling means 509. Preferably, the assembling means 509 would perform some form of averaging of the received analog signals. Alternatively, the assembling means may effect an analog computation of a convolution with a Gaussian distribution (which is described in greater detail below). The analog signal from assembling means 509 is then captured through analog sample and hold circuitry 510 and is used for controlling light valve 511.

As described above, the assembling means 509 may create the final pixel value by effecting an analog computation of a convolution with a Gaussian distribution . Such analog processing is described in issued U.S. Pat. No. 5,567,971 entitled "Variable Size Light Sensor Element", filed Jun. 7, 1995, and which is assigned to the assignee of the present invention. Such analog processing would typically be embodied as a separate layer within the display. It should be further noted that the pixel values from the various processing elements may also be assembled in the digital domain. In this instance, the assembling means 509 would receive the digital signals from communications controller 501 and combine (e.g. average) them. The resulting digital signal would then be converted to analog form by a D/A converter. The analog signal would then be captured by analog sample and hold circuitry for controlling the light valve.

In the foregoing description, various references are made to "mesh processing". This is meant to refer to the net effect of the collective processing performed by the processing elements. As will be described in greater detail below, such mesh processing is analogous to processing performed by neural networks or other highly networked computing environments containing discrete processing components.

In the currently preferred embodiment of the present invention, the pixel rendering is split between the host computer system and the rendering mesh contained within the display. The computer system may perform initial rendering, while the rendering mesh performs the final rendering. This is advantageous in that it can lead to reductions in bandwidth requirements between the display and the host computer system. For example, certain manipulations of an image can be performed entirely within the mesh such as distortions or other image processing functions such as the introduction of blurring or fades.

Figure 6:
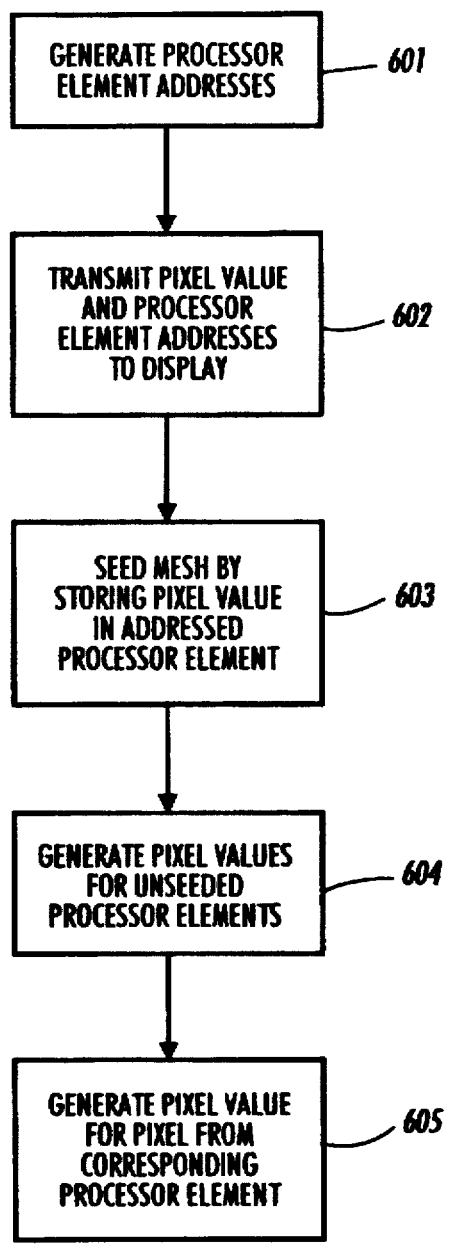
FIG. 6 is a flowchart illustrating the steps for rendering an image using the bit-mapped display system of the currently preferred embodiment of the present invention.

FIG. 6 is a flowchart illustrating the steps for rendering using the system of the present invention. Prior to the steps of FIG. 6, it is assumed that an original version of the image has been rendered or otherwise provided and has been stored in the frame buffer. In some instances, this original version will be displayed. In other instances, the original image may not be what is to be displayed. For example, the image may have been previously rendered and saved as a bit mapped file. In any event, referring to FIG. 6, processor element addresses are generated for the desired image and stored in the rendering mesh map, step 601. The generation of the process element addresses is performed by the computer system. The addresses generated will depend on the type of transformation being performed on the original image. Next, pixel values and corresponding processor element addresses are transmitted to the display processing mesh, step 602. The pixel values are stored in the processor element specified by the processor element address, step 603. When this step is completed, it is said the display processing mesh has been seeded with pixel values. Pixel values for each of the "unseeded" processor elements are then generated, step 604. This may be accomplished for example by having processor elements taking on the value of neighboring processor elements. From the pixel values contained in each of the processor elements and the type of rendering to be performed the final pixel values are generated, step 605. For example, the ultimate pixel value may be a simple or weighted average of the pixel values of the processing elements corresponding to the pixel. In any event, mesh processing is described in greater detail below.

Computer System Processing

Interactive graphical systems allow images to be manipulated. This will typically require a re-rendering of a picture. For example, a graphical system may have a function which allows a user to rotate the view of an image. To accomplish this, spatial transformations are performed to create the new view from an image coordinate system to a display coordinate system. The display coordinate system may be represented as a subpixel coordinate system wherein multiple-subpixels correspond to a particular pixel. The subpixel values are then combined to create the resulting pixel value. The combination method may be simple averaging, weighted averaging or some other technique.

As described by FIG. 6, the computer system is used to generate the processor element addresses that are stored in the frame buffer map. The generation of processor element addresses will depend on the type of manipulation of the image desired. Generally, the processing will involve a simple perspective transformation of the pixel address of the original image stored in the frame buffer. The transformation function will correspond to the desired manipulation. Such a transformation function may be through a direct computation or via the use of a look-up table and interpolation. The approximate center of each pixel in the transformed image is then mapped to a particular processor element address.

Figure 7:
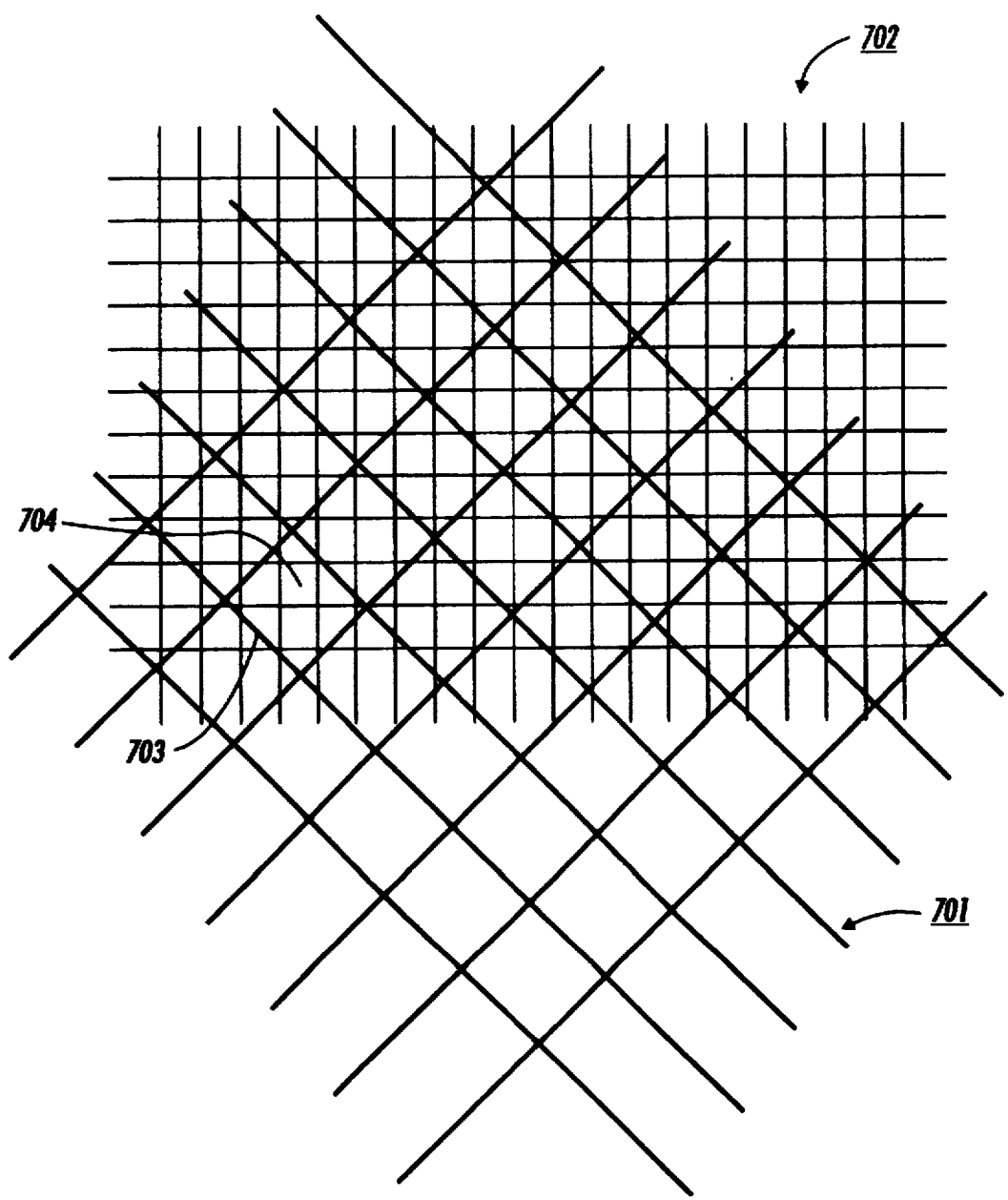
FIG. 7 illustrates a transformed image in relation to a processing mesh in the currently preferred embodiment of the present invention.

This is illustrated in FIG. 7. Referring to FIG. 7, a representation of the transformed image 701 (illustrated as the angled grid with large squares) is shown in relation to a representation of mesh 702 (illustrated as the horizontal grid with small squares). Each square of the transformed image 701 corresponds to a pixel in the transformed image. Each square in the mesh 702 corresponds to a processing element. Pixel A 703 of transformed image 701 is shown to have an approximate center that lies above a processing element X 704 of mesh 702. Thus, the storage location in the frame buffer map corresponding to the pixel A 703 will contain the address for processing element X 704.

Mesh Processing

As described above, the mesh is a collection of interconnected processing elements which are used to generate the final rendering value. The processing described herein will typically occur in parallel. As noted above, the processing elements comprising the mesh are grouped. Each group of processing elements contributes to the rendering of an individual pixel. However, this is not to mean that processing elements cannot communicate with other processing elements that are not within their group. In the present invention, for the purposes of rendering an image, each of the processing elements may be conceptually thought of as a subpixel. Accordingly, various rendering techniques which may utilize the notion of subpixels may be performed using the mesh processing capabilities.

Generally, each of the processor elements in the mesh operates in the same fashion. However, one of the processor elements in a group will generate the ultimate pixel value for the group and control the corresponding pixel. In the currently preferred embodiment, the processing elements are only able to communicate with horizontal or vertical neighbors. However, it would be apparent to one of skill in the art to include means for certain processing elements to communicate with diagonal neighbors, or to have processing elements communicate in a hexogonal pattern.

Figure 8:
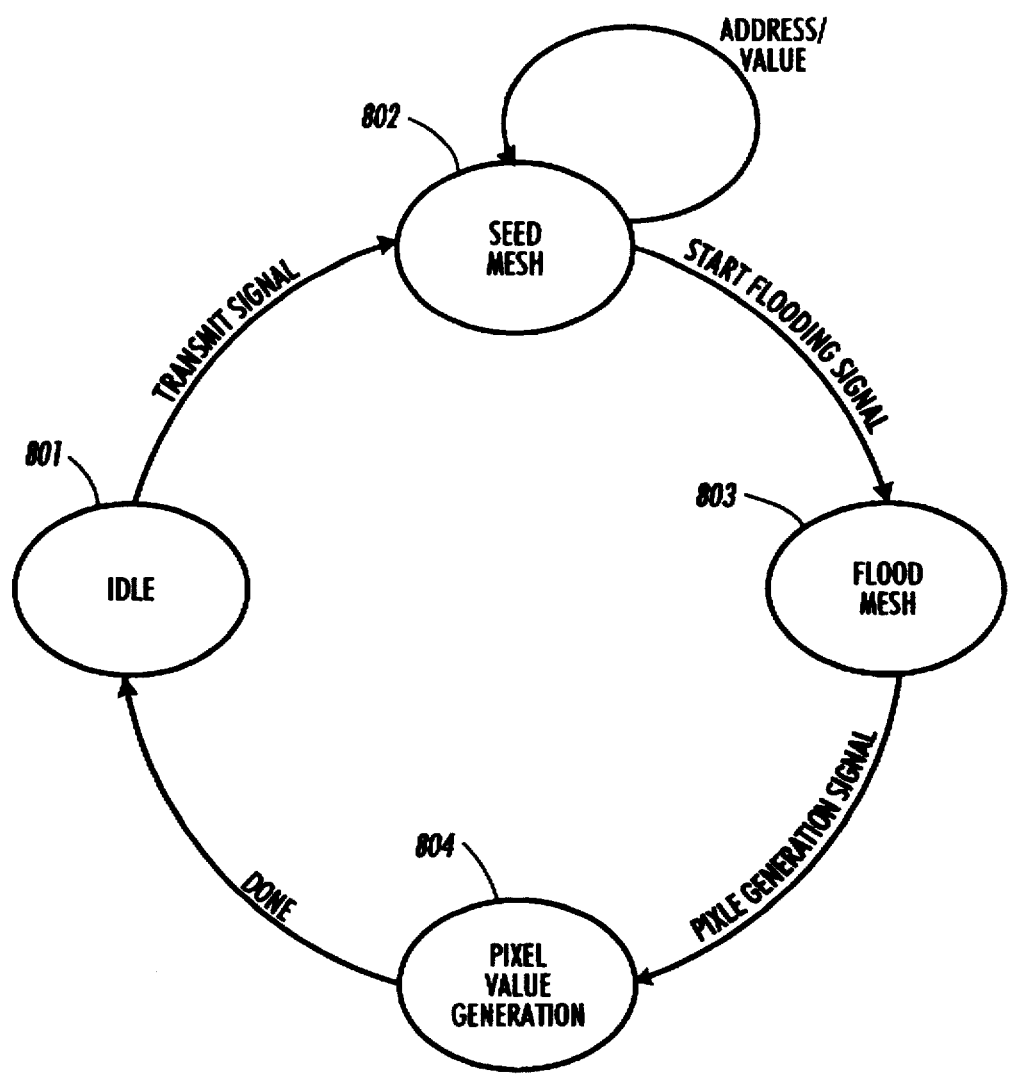
FIG. 8 is a state diagram illustrating the states of the processing mesh of the currently preferred embodiment of the present invention.

FIG. 8 is a state diagram overviewing the operation of the mesh. The mesh is initially in an idle state 801. When in the idle state 801 no processing is being performed by the mesh. A seed mesh state 802 is entered upon the receipt of a transmit data signal from the host computer system. During this seeding state, a pixel value and processor element pair is received, and the pixel value stored in the memory of the addressed processor element. In any event, once the mesh has been seeded, a flood mesh state 803 is entered. In the flood mesh state, pixel values for the unseeded processing elements are generated. The manner in which the pixel values for the unseeded processing elements is to assume the value of a "neighbor" processing element which includes some conflict resolution mechanism. This process continues until all of the processing elements have a pixel value.

Once each of the processing elements has a pixel value (or an acceptable amount of them have a pixel value), the final pixel value is generated in pixel value generation state 804. As noted above various techniques for combining the subpixel values may be utilized.

EXAMPLE

Figure 9:
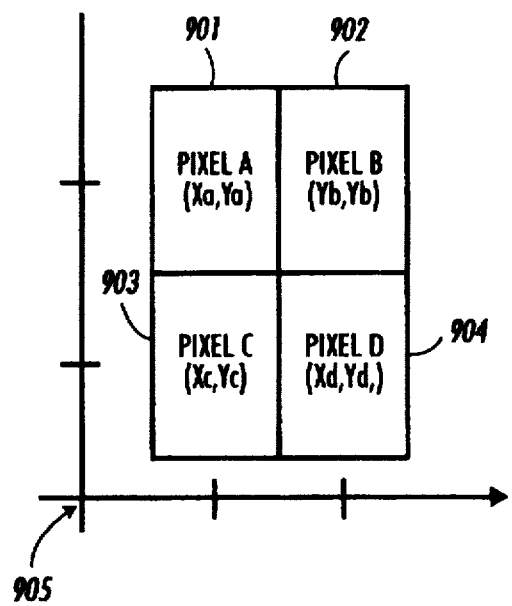
FIG. 9 illustrates the spatial location of a group of pixels in display coordinate system.

The operation of the present invention is further detailed in FIGS. 9–13. Referring to FIG. 9, a portion of a rendered image is represented by Pixel A 901, Pixel B 902, Pixel C 903 and Pixel D 904 as mapped to (X,Y) coordinates on coordinate system 905. The address for any of the pixels on the coordinate system corresponds to its frame buffer address. The pixel values for the rendered image are stored in the frame buffer. In this example, Pixel A has a pixel value PixA stored at address Xa,Ya, Pixel B has a pixel value PixB stored at address Xb,Yb, Pixel C has a pixel value PixC stored at address Xc,Yc, and Pixel D has a pixel value PixD stored at address Xd,Yd.

Figure 10:
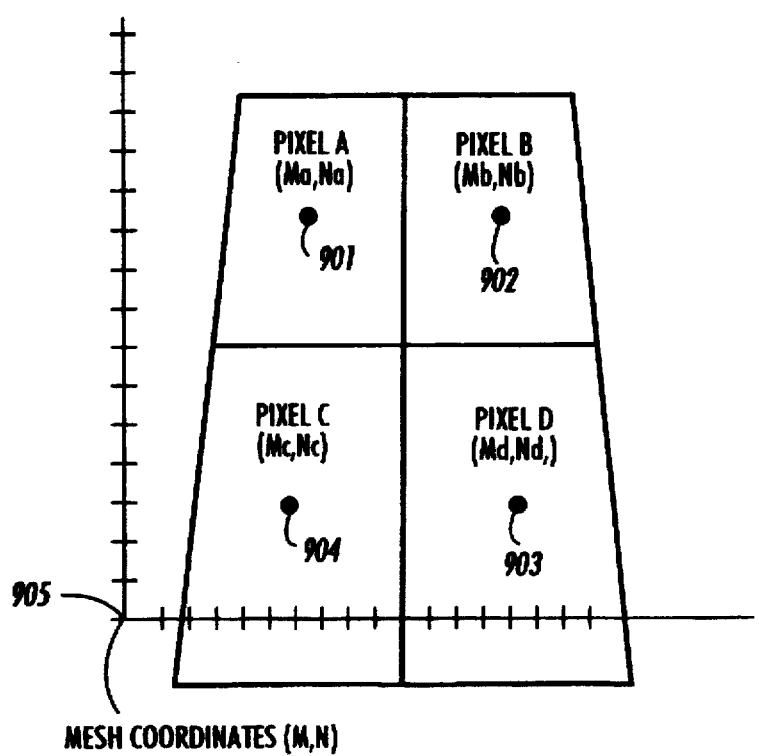
FIG. 10 illustrates the group of pixels of FIG. 9 after they have been transformed and mapped to a mesh coordinate system of the currently preferred embodiment of the present invention.

Now, the image is transformed in the desired manner. The transformation may be an introduced distortion, a scaling of the image or a movement of the image. The transformation can be direct and real-time calculations using look-up tables or the like, or alternatively, the distortions may be predetermined so as to enable the use of precalculated addresses. In any event, this manipulation results in placements of the Pixels A–D on a mesh coordinate system as illustrated in FIG. 10. Referring to FIG. 10, the Pixel A 901 has been mapped to mesh coordinates Ma,Na, the Pixel B 902 has been mapped to mesh coordinates Mb,Nb, the Pixel C 903 has been mapped to mesh coordinates Mc,Nc, and the Pixel D 904 has been mapped to mesh coordinates Md,Nd 1001. Each of the mesh coordinates is the address of an individual processor element in the mesh. Note that these mesh addresses represent the spatial location of the approximate center of the transformed pixels.

As noted above, the frame buffer and the rendering map have the same dimensions. Accordingly, the address Xa,Ya of the rendering mesh map will store the mesh address Ma,Na, the address Xb,Yb will store the address Mb,Nb, the address Xc,Yc will store the address Mc,Nc,and the address Xd,Yd will store the address Md,Nd.

When the image is to be transmitted to the display, the pairs will consist of the contents of corresponding locations of the frame buffer and the rendering mesh map.

Figure 11:
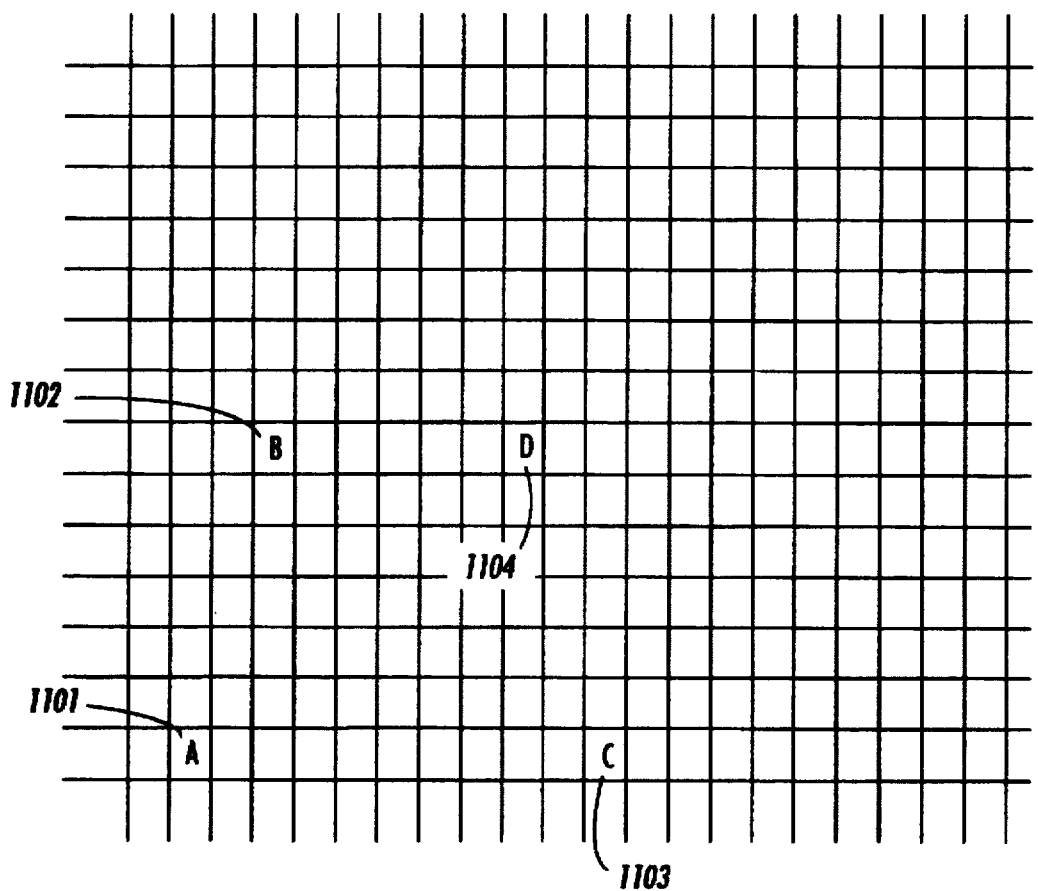
FIG. 11 illustrates a seeded mesh in the currently preferred embodiment of the present invention.
Figure 12:
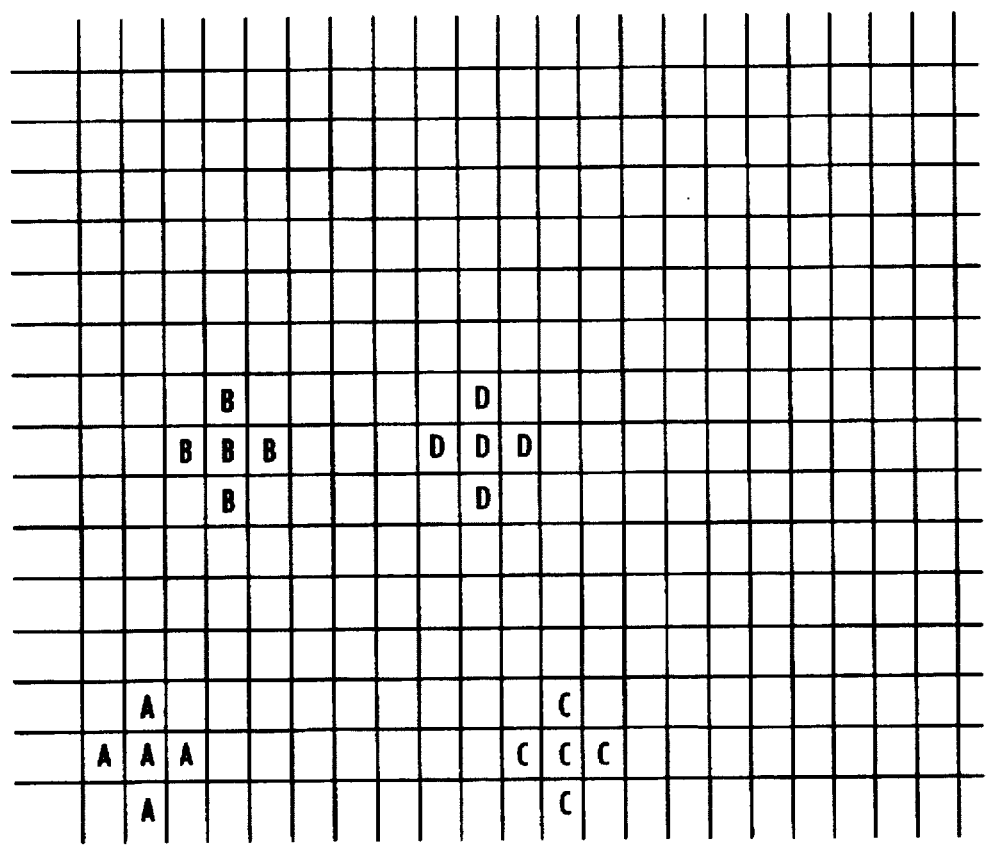
FIGS. 12–13 are diagrams illustrating successive steps in "flooding" a mesh in the currently preferred embodiment of the present invention.
Figure 13:
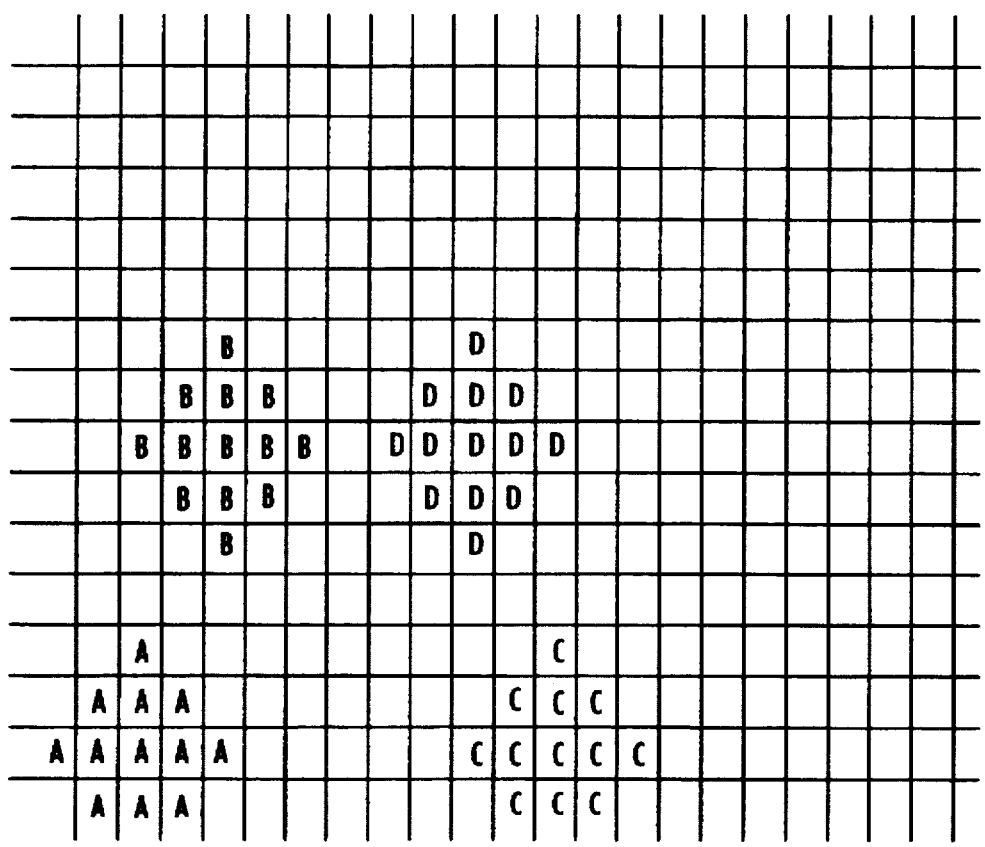

FIG. 11 illustrates the rendering mesh after it has been seeded with pixel values. Referring to FIG. 11, each block represents a discrete processing element and each of the 3×3 squares of processing elements corresponds to a pixel on a display, we see that the value PixA has been placed in a processing element 1101, the value PixB has been placed in processing element 1102, the value PixC has been placed in processing element 1103 and the value PixD has been placed in processing element 1104. FIGS. 12–13 illustrates a nearest neighbor technique for assigning pixel values for the unseeded processing elements. Referring to FIG. 12, the horizontal and vertical neighbors which do not have pixel values take on the neighbors pixel value. Note that this "flooding" of pixel values crosses the 3×3 squares indicating the processing elements for a pixel. FIG. 13 illustrates another iteration of flooding. This continues until all the processor elements have pixel values.

It should be noted that ties, i.e. when multiple neighbors of a processing elements have a pixel value, can be resolved in various fashions. First, ties can be broken arbitrarily. Second, ties can be broken consistently based on the flooding direction (e.g. first flood top neighbors, then bottom, then left, then right) with a bias being intentionally made in the seeding process to compensate. Third, the values of the neighbors could be averaged. The choice of technique used for breaking ties will depend on various factors including the resolution of the rendering mesh.

Once each processor element has a pixel value a pixel value is determined by combining the pixel values of the corresponding processing elements. It should be noted that other types of image processing may be performed (e.g. anti-aliasing or image smoothing). Such image processing would be implemented at each of the processing elements of the rendering mesh.

Thus, a system for image generation having display based computation system is disclosed. While the present invention is described with respect to a preferred embodiment, it would be apparent to one skilled in the art to practice the present invention with other configurations of document processing systems. Such alternative embodiments would not cause departure from the spirit and scope of the present invention.

What is claimed:

1. A graphical display system comprising:

a display having a display substrate, said display substrate having defined therein a plurality of pixels and a rendering mesh, said rendering mesh comprised of a plurality of addressable processing elements organized into a plurality of pixel rendering groups, each of said plurality of pixel rendering groups for generating a pixel value for a corresponding one of said plurality of pixels; and a host processing system for providing display information to said display, said host processing system further comprising:

a rendering means for generating a plurality of pixel data for an original image;

a frame buffer coupled to said rendering means, said frame buffer for storing said plurality of pixel data for said original image;

a transformation means coupled to said frame buffer, said transformation means for transforming pixel addresses of said original image to processing element addresses based on a manipulation of said original image, a rendering mesh map coupled to said transformation means, said rendering mesh map for storing said processing element addresses generated by said transformation means; and a transmission means coupled to said frame buffer and said rendering mesh map, said transmission means for transmitting said display information to said display, said display information comprising pairs of an associated one of said plurality of pixel data from said frame buffer and a corresponding one of said processing element addresses from said rendering mesh map.

2. The graphical display system as recited in claim 1 wherein said rendering mesh has a first operating state wherein a set of processing elements are seeded with pixel data from said transmission means; a second operating state for generating pixel data for unseeded processing elements; and a third operating state for generating pixel values for each of said plurality of pixels based on the pixel data in the processing elements.

3. The graphical display system as recited in claim 1 wherein each of said processing elements is comprised of:

mesh communications means for transferring pixel values to and from neighboring processing elements;

storage means for storing a pixel value;

a state indicator for indicating if said processing element contains a pixel value; and a first processing means for controlling the flooding of pixel values in said rendering mesh.

4. The graphical display system as recited in claim 3 wherein one of said processing elements in a pixel rendering group is for controlling a corresponding one of said plurality of pixels and is further comprised of:

a light valve for controlling the display characteristics of said corresponding one of said plurality of pixels;

a second processing means for combining pixel values of corresponding other processing elements to create a final pixel value; and means for converting said final pixel value into a signal for controlling said light valve.

5. The graphical display system as recited in claim 4 wherein said display substrate is a fabricated polysilicon material.

6. The graphical display system as recited in claim 1 wherein said transformation means is comprised of means for transforming pixel addresses of said original image to processing element addresses based on a distortion of said original image.

7. A method for generating final pixel values for displaying an image from pixel data for an original image stored in a frame buffer, said method comprising the steps of:

a) creating a set of processing element addresses from said original image, each of said processing element addresses corresponding to a pixel address of said original image;

b) storing said processing element addresses in a display mesh map, each of said processing element addresses corresponding to an instance of pixel data in said frame buffer;

c) transmitting each said instance of pixel data from said frame buffer to an associated one of a plurality of processing elements of said display using a corresponding one of said processing element addresses from said display mesh map, said plurality of processing elements embedded on a substrate with pixels of said display and said plurality of processing elements addressable by said processing element addresses, wherein upon completion of said transmitting step said plurality of processing elements is comprised of a set of seeded processing elements and a set of unseeded processing elements;

d) generating a new instance of pixel data for each processing element of said set of unseeded processing elements; and e) generating said final pixel values for said image based on each said instance of pixel data and new instance of pixel data of said plurality of processing elements.

8. The method as recited in claim 7 wherein said step of creating a set of processing element addresses from said original image is further comprised of the step of performing a mapping of an address space of said frame buffer to an address space of said processing elements to achieve a desired effect on said original image when displayed.

9. The method as recited in claim 8 wherein said desired effect is a distortion of said original image.

10. The method as recited in claim 8 wherein said step of generating a new instance of pixel data for each processing element of said set of unseeded processing elements is further comprised of the step of a first processing element in said set of seeded processing elements transmitting its' instance of pixel data to a second processing element in said set of unseeded processing elements as said new instance of pixel data.

11. The method as recited in claim 10 wherein said step of generating a new instance of pixel data for each processing element of said set of unseeded processing elements is further comprised of the step of resolving a conflict caused by a third processing element in said set of seeded processing elements seeking to transmit its pixel data to said second processing element by averaging said pixel data of said first processing element in said set of seeded processing elements and said third processing element in said set of seeded processing elements and providing as said new instance of pixel data to said second processing element.

12. The method as recited in claim 10 wherein said step of generating a new instance of pixel data for each processing element of said set of unseeded processing elements is further comprised of the step of resolving a conflict caused by a third processing element in said set of seeded processing elements seeking to transmit its pixel data to said second processing element by arbitrarily assigning one of said instance of pixel data for said first processing element or of said instance of pixel data for said third processing element to said second processing element as said new instance of pixel data.

13. The method as recited in claim 10 wherein said step of generating a new instance of pixel data for each processing element of said set of unseeded processing elements is further comprised of the step of resolving a conflict caused by a third processing element in said set of seeded processing elements seeking to transmit its pixel data to said second processing element by assigning one of said instance of pixel data for said first processing element or of said instance of pixel data for said third processing element to said second processing element according to a predetermined bias as said new instance of pixel data.

14. The method as recited in claim 8 wherein said step of generating said final pixel values for said image based on each said instance of pixel data and new instance of pixel data of said plurality of processing elements is further comprised of the step of for each pixel generating an average pixel value from said instances of pixel data and new instances of pixel data of a corresponding grouping of said plurality of processing elements.

* * * * *